United States Patent
Gellerich et al.

(10) Patent No.: US 10,901,908 B2
(45) Date of Patent: Jan. 26, 2021

(54) STORING DATA INTO A MEMORY

(71) Applicant: International Business Machines Corporation, Armonk, NY (US)

(72) Inventors: Wolfgang Gellerich, Boeblingen (DE); Peter Altevogt, Ettlingen (DE); Martin Bernhard Schmidt, Stuttgart (DE); Martin Schwidefsky, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/248,827

(22) Filed: Jan. 16, 2019

(65) Prior Publication Data

US 2020/0226068 A1    Jul. 16, 2020

(51) Int. Cl.
| | |
|---|---|
| *G06F 12/0891* | (2016.01) |
| *G06F 12/12* | (2016.01) |
| *G06F 12/02* | (2006.01) |
| *G06F 12/0897* | (2016.01) |
| *G06F 12/0804* | (2016.01) |

(52) U.S. Cl.
CPC ...... *G06F 12/0891* (2013.01); *G06F 12/0246* (2013.01); *G06F 12/0804* (2013.01); *G06F 12/0897* (2013.01); *G06F 12/12* (2013.01)

(58) Field of Classification Search
CPC ............. G06F 12/0891; G06F 12/0246; G06F 12/0897; G06F 12/0804; G06F 12/12; G06F 12/02
USPC ........................................................ 711/133
See application file for complete search history.

(56) References Cited

U.S. PATENT DOCUMENTS

| | | |
|---|---|---|
| 3,845,474 A | 10/1974 | Lange et al. |
| 3,979,725 A | 9/1976 | Disparte et al. |
| 4,322,795 A | 3/1982 | Lange et al. |
| 4,399,506 A | 8/1983 | Evans et al. |
| 4,471,429 A | 9/1984 | Porter et al. |
| 4,525,777 A | 6/1985 | Webster et al. |
| 4,720,819 A | 1/1988 | Pinkham et al. |
| 5,809,548 A | 9/1998 | Chang et al. |
| 6,003,112 A | 12/1999 | Tetrick |
| 6,253,319 B1 | 6/2001 | Tran et al. |

(Continued)

OTHER PUBLICATIONS

M. E. Acacio, J. Gonzalez, J. M. Garcia and J. Duato, "Reducing the latency of L2 misses in shared-memory multiprocessors through on-chip directory integration," Proceedings 10th Euromicro Workshop on Parallel, Distributed and Network-based Processing, Canary Islands, Spain, 2002, pp. 368-375.*

(Continued)

*Primary Examiner* — Pierre Miche Bataille
(74) *Attorney, Agent, or Firm* — Jamar K. Ray (57) ABSTRACT

The present disclosure relates to storing data in a computer system. The computer system comprising a main memory coupled to a processor and a cache hierarchy. The main memory comprises a predefined bit pattern replacing existing data of the main memory. Aspects include storing the predefined bit pattern into a reference storage of the computer system. At least one bit in a cache directory entry of a first cache line of the cache hierarchy can be set. Upon receiving a request to read the content of the first cache line, the request can be redirected to the predefined bit pattern in the reference storage based on the value of the set bit of the first cache line.

20 Claims, 5 Drawing Sheets

(56) References Cited

U.S. PATENT DOCUMENTS

| | | | |
|---|---|---|---|
| 6,314,492 B1 | 11/2001 | Allen et al. | |
| 6,339,813 B1* | 1/2002 | Smith, III | G06F 12/0859 |
| | | | 711/133 |
| 6,647,466 B2* | 11/2003 | Steely, Jr. | G06F 12/0897 |
| | | | 711/122 |
| 7,984,233 B2 | 7/2011 | Sinclair | |
| 9,158,697 B2 | 10/2015 | Lu et al. | |
| 9,244,861 B2* | 1/2016 | de la Iglesia | G06F 12/0871 |
| 2002/0095554 A1* | 7/2002 | McCrory | G06F 12/0815 |
| | | | 711/144 |
| 2007/0113020 A1 | 5/2007 | Gunna et al. | |
| 2014/0047175 A1 | 2/2014 | Abali et al. | |
| 2014/0258637 A1 | 9/2014 | Hong et al. | |
| 2015/0032964 A1* | 1/2015 | Habermann | G06F 12/0848 |
| | | | 711/122 |
| 2015/0143047 A1* | 5/2015 | Hagersten | G06F 12/0897 |
| | | | 711/122 |
| 2015/0347302 A1* | 12/2015 | Hagersten | G06F 12/0888 |
| | | | 711/122 |
| 2016/0098317 A1* | 4/2016 | Alhussien | G11C 27/005 |
| | | | 714/764 |

OTHER PUBLICATIONS

Unknown, "ARM Infocenter", printed Oct. 18, 2018, 2 pages http://infocenter.arm.com/help/index.jsp?topic=/com.arm.doc.ddi0500d/CHDJEAAJ.html.

IBM, "AIX older versions", IBM Knowledge Center, printed Oct. 18, 2018, 3 pages https://www.ibm.com/support/knowledgecenter/ssw_aix_61/com.ibm.aix.alangref/idalangref_dcbz_instrs.htm.

Loh et al., "Efficiently enabling conventional block sizes for very large die-stacked DRAM caches", MICRO 11, Dec. 3-7, 2011, 11 pages.

* cited by examiner

STORING DATA INTO A MEMORY

BACKGROUND

The present disclosure relates to digital computer systems, and more specifically, to storing data into a memory.

Memory clearing of large data blocks is frequently executed for system initialization or for security reasons. However, memory clearing can be a complex process as it can be executed on each cache line holding the cleared data. This complexity increases with the number of cache lines to be cleared.

SUMMARY

Aspects of the present disclosure are directed toward a method for storing data in a computer system. The method comprising storing a predefined bit pattern into a reference storage of the computer system. The computer system can include a main memory coupled to a processor and a cache hierarchy. The cache hierarchy can include a plurality of cache levels ordered in accordance with a speed of access by the processor to respective cache levels of the plurality of cache levels, where a highest cache level is closest to the processor, and where a lowest cache level is closest to the main memory. The main memory can further include the predefined bit pattern replacing existing data of the main memory. The method can further comprise setting a value of a first bit in a cache directory entry of a first cache line of the cache hierarchy, where the first cache line includes the existing data. The method can further comprise receiving a request to read the existing data of the first cache line. The method can further comprise, in response to receiving the request to read the existing data of the first cache line, redirecting the request to the predefined bit pattern in the reference storage based on the value of the first bit in the cache directory entry of the first cache line.

Other embodiments are directed toward a system and computer program product configured to perform similar functionality as the method described above. It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above, and other objects, features, and advantages of the present disclosure will become more apparent. Herein, the same reference generally refers to the same components in the embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the spirit and scope of the present disclosure.

The present disclosure addresses a performance bottleneck in the cache hierarchy that occurs when a user program or operating system is writing chunks of the same bit pattern to areas of a main memory. Such bottlenecks can occur when the operating system is clearing memory locations for security reasons by writing zero patterns. This is a common problem present in most existing processors. The present disclosure provides a fast way for turning an arbitrary cache line into one with the desired content. With the present disclosure, a cache line behaves as if the desired content had been stored into it. This can particularly be advantageous when replacing or overwriting a large portion of data of the main memory (that is also present in the cache) by a same bit pattern.

For example, each of the one or more cache lines can comprise the replaced data of the main memory. In another example, the replaced data can be shared between, or spread over, the one or more cache lines. The one or more cache lines can belong to one or more predefined cache levels of the cache hierarchy. Some embodiments can include identifying in the predefined cache level the one or more caches lines that comprise the replaced data. The reference storage can, for example, be provided as part of the predefined cache levels. For example, for more than one predefined cache level, the reference storage can be part of each of the predefined cache levels.

The terms used herein relating to "cache hierarchy" (e.g., cache hierarchy, multi-level cache, cache, etc.) refers to a memory architecture which uses a hierarchy of memory stores (or cache levels) based on varying access speeds to cache data. A cache level enabling the highest speed access is the highest cache level and vice versa (e.g., the cache level with the lowest speed access is the lowest cache level). The cache hierarchy can, for example, comprise three cache levels L1, L2 and L3, where the L1, L2 and L3 are ordered such that L1 is the highest level, followed by L2 and the lowest level is L3 (e.g., L3 has the lowest-speed access compared to L1 and L2). The highest cache level is the cache level closest to the processor. The lowest cache level is the cache level closest to main memory.

The term "cache line" refers to a n-byte block of data in the cache which corresponds to a single cache directory entry, where n can, for example, be equal to 64, 128, 256 etc.

Embodiments of the present disclosure can further comprise a cache directory. For example, each cache line of the cache levels can have a corresponding cache directory entry in the cache directory. The setting of at least one bit is performed in each cache directory entry of the one or more cache lines.

Embodiments of the present disclosure can further comprise a reference storage. The reference storage can be a storage unit of the computer system that is configured to store data and that is configured to be accessed by the processor of the computer system. The storage unit can be part of the main memory, the cache of the computer system, or an additional storage of the computer system. In some embodiments, the reference storage can comprise one cache line which can be referred to as constant cache line (CCL) as it may not be modified after the initialization.

According to some embodiments, the storage of the bit pattern into the reference storage is performed at the initialization stage of the computer system before receiving the request. Such embodiments can further include preventing write accesses to the reference storage after the initialization stage. For example, the content of the reference storage can be hard-wired at the initialization stage. These embodiments can be used to reliably replace data in the main memory. Having a constant content of the reference storage can enable consistent data processing before reinitializing the computer system. The storage of the bit pattern can be performed again if the computer system is reinitialized.

Some embodiments further comprise performing a copy-on-write operation of the bit pattern of the reference storage based on the value of the set bit in the cache directory entry of the one or more cache lines and in response to receiving a store instruction to store data in a certain cache line of the one or more cache lines. In some embodiments, upon receiving the store instruction, it can be determined if the set bit in the cache directory entry of the certain cache line has a value indicating the redirection of the read requests to the reference storage, and if so the copy-on-write operation is performed.

If the redirection is implemented at the upper-most cache level (which also receives the store operation), the copy-on-write operation can be implemented as an additional action. For example, if a cache line has been redirected to a reference storage, the reference storage's content is copied into a regular cache line before the first store operation occurs. This copy-on-write can be performed using additional logic within the cache. In a cache hierarchy with at least two cache levels, the normal cache operations are sufficient to achieve the desired copy-on-write because both the normal eviction of a cache line from the higher cache level into the lower cache level, and the propagation of a cache line to a higher cache level can perform the required copy action.

Some embodiments further comprise moving the content of a cache line to the main memory in response to determining that the cache line of the one or more cache lines is not used for a predefined time period. If a cache line redirected to the reference storage is not used again for some time, it can get written back to the main memory as part of the cache replacement mechanism.

However, a certain cache line might be subject of a write operation shortly after it is set in accordance with the present disclosure and while it is still in the cache. In this case, the copy-on-write operation can be performed. According to some embodiments, the store instruction is received within the predefined time period.

According to some embodiments, the certain cache line is part of a given cache level of the cache hierarchy, where the copy-on-write operation comprises copying the bit pattern of the reference storage to a higher cache level of the given cache level before storing the data in the certain cache line. For example, when the cache hierarchy comprises two cache levels L1 and L2 and the certain cache line is part of L2, the bit pattern of the reference storage can be copied to a cache line of L1. This embodiment can enable seamless integration of the present disclosure with existing systems. Using the copy-on-write operation can prevent performing significant changes to existing systems.

According to some embodiments, the cache hierarchy comprises multiple cache levels, and such embodiments can further comprise determining that a cache line of the one or more cache lines is part of a predefined cache level of the cache hierarchy, where the setting further comprises marking the content of the cache line corresponding to the determined cache line in each cache level higher than the predefined cache level as invalid. This can enable consistent access to data in the multiple levels of the cache hierarchy.

Some embodiments further comprise consecutively copying from each cache level of the cache hierarchy starting from the predefined cache level to a cache line of a following higher cache level, the bit pattern and resetting the bit of the determined cache line for disabling the redirection. For example, when the cache hierarchy comprises three cache levels L1, L2 and L3 and the predefined cache level is L3, the bit pattern of the reference storage can first be copied from the reference storage to a cache line of L2 and then the bit pattern can be copied from L2 to a cache line of L1.

Some embodiments further comprise copying the bit pattern to a cache line of a cache level higher than the predefined cache level, resetting the bit of the determined cache line for disabling the redirection, and optionally marking the content of the determined cache line as invalid. This can enable a copy-up operation of redirected cache-line content to the higher level cache, thereby freeing up the predefined cache level. The deletion of the content of the determined cache line can be optional as the access to the bit pattern can be performed at the cache level before the predefined cache level, where that higher cache level has the bit pattern.

According to some embodiments, the cache hierarchy comprises two or three cache levels, where the predefined cache level is the second cache level.

According to some embodiments, the predefined cache level includes a cache directory comprising for each cache line in the predefined cache level a corresponding entry. Such embodiments can further comprise indicating that the determined cache line is a modified cache line using the corresponding entry in the cache directory. This can enable a seamless integration of the present embodiment in existing systems.

According to some embodiments, the reference storage comprises one or more cache lines. For example, for each set of cache lines drawn from the one or more cache lines and that belong to a same cache level, that set of cache lines can be redirected to a same cache line which is the reference storage, where the reference storage can be part of that same cache level.

According to some embodiments, the data is replaced in response to receiving a request to erase the data, where the predefined bit pattern comprises zeros. These embodiments can improve the memory clearing performance of the memory systems.

According to some embodiments, when the bit pattern only includes zero values, instead of (or in addition to) performing the redirection, such embodiments return zero upon read access to said cache line. This can enable an efficient alternative (in term of resources) to performing the redirection. This embodiment can be advantageous when the bit pattern comprises only zeros, only ones, or other simple patterns. In some embodiments, redirecting cache line accesses to the reference storage can be replaced by a flag indicating that the cache line has been cleared. When the bit is set, any read access to the respective cache line returns zeros rather than the line's real content. This can provide a simple scheme for clearing memories.

In one example, the one or more cache lines can be redirected using the flags and/or the reference storage. For example, if the one or more cache lines comprise a set of cache lines of a same cache level of the cache hierarchy, a first subset of the set can be associated with the reference storage for redirecting the read accesses to the first subset of cache lines to the reference storage. Furthermore, read accesses to a second subset of cache lines of the set can be redirected using the flags.

Some embodiments further include providing a machine instruction configured to store the bit pattern into the reference storage. Using the machine instruction can enable a flexible choice of the bit pattern to replace or overwrite data of the main memory.

Figure 1:
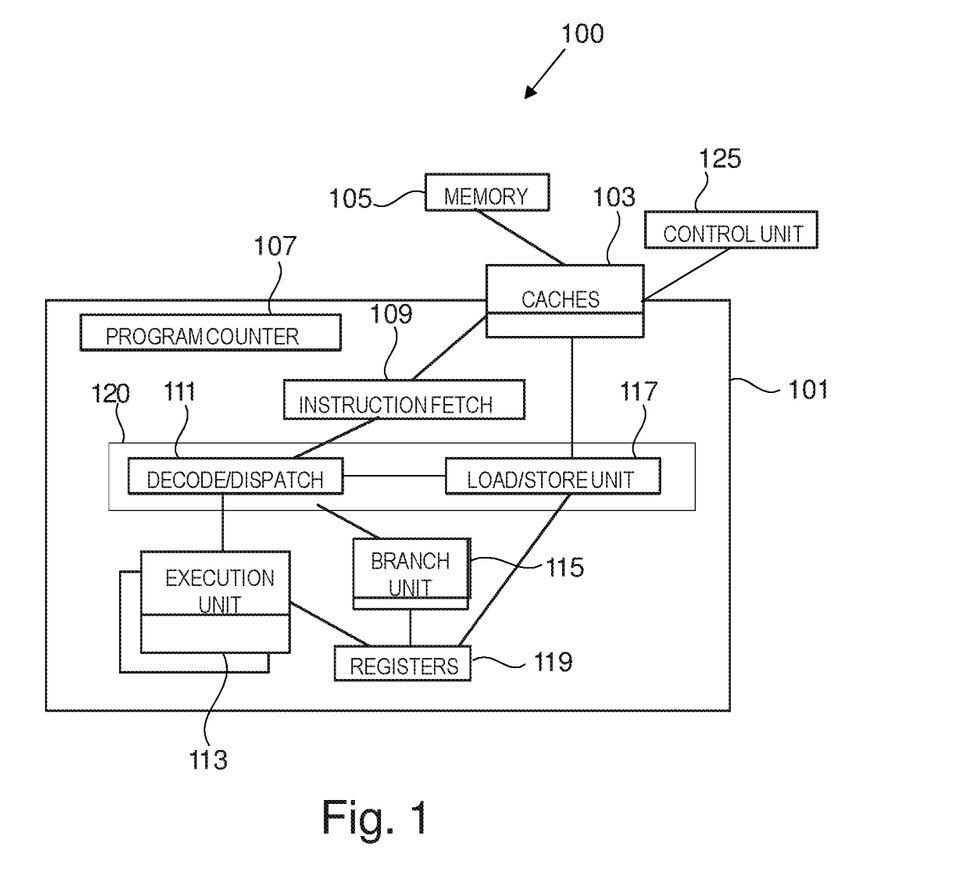
FIG. 1 is an exemplary structure of a processor, in accordance with embodiments of the present disclosure.

FIG. 1 is an exemplary structure of a computer system 100 comprising a processor 101, main memory 105 and cache 103.

The cache 103 is employed to buffer memory data in order to improve processor performance. The cache 103 is a high speed buffer holding cache lines of memory data that are likely to be used (e.g., cache 103 is configured to cache data of the main memory 105). Typical cache lines are 64, 128 or 256 bytes of memory data. The cache 103 can be a multiple-level cache. For example, the cache 103 can be a two-level cache or a three-level cache. Each cache line of the cache 103 can store words of a data block of the main memory 105. The data stored in memory 105 and stored in a corresponding cache line of the cache 103 can be cleared by, for example, storing a predefined bit pattern in the cache line.

The cache 103 is shown as a separate component of the processor 101. In another example, at least part of the cache 103 can be part of one or more components of the processor 101. For example, the load and store unit 117 can comprise a cache level of the cache 103. The cache 103 can, for example, be on a same chip such as an International Business Machines Corporation (IBM) central processor (CP) chip.

Each cache level of the cache 103 can comprise data arrays which can be implemented using high-speed memory devices. The cache level can further comprise a cache directory associated with the data array of the cache level. For example, each cache line in the data array can have a corresponding entry in the cache directory. The cache directory can indicate whether the data identified by an effective address is stored in the data array. For example, a processor instruction that references an effective address can be provided to the cache 103. If the effective address is in the cache directory, then the processor can get the referenced data from the data array subject to access criteria being fulfilled, where access criteria can require that the valid bit is set etc.

The cache 103 is associated with a control unit (or a cache controller or a cache management logic) 125 that, for example, manages the transfer of data between the processor 101 and the cache 103. The control unit 125 can be configured to perform aspects of the present disclosure.

In some embodiments, the cache 103 can be a two-level cache or a three-level cache. The cache 103 can, for example, be configured to perform a write-back storage method. For example, the cache 103 can comprise three cache levels L1, L2 and L3, where the L1, L2 and L3 are ordered such that L1 is the highest level and the lowest level is L3 (e.g., L3 has the lowest-speed access compared to L1 and L2). L1 is closest to the processor (e.g., machine instructions operate on data stored in L1 cache lines). In one example, every cache line currently in L1 is also in L2 and in L3.

A program counter (instruction counter) 107 tracks the address of the current instruction to be executed. A program counter 107 in a z/Architecture® (a registered trademark of International Business Machines Corporation) processor is 64 bits and can be truncated to 31 bits or 24 bits to support prior addressing limits. A program counter 107 can typically be embodied in a program status word (PSW) of a computer such that it persists during context switching. Thus, a program in progress, having a program counter value, can be interrupted by, for example, the operating system (context switch from the program environment to the operating system environment). The PSW of the program maintains the program counter value while the program is not active, and the program counter 107 (in the PSW) of the operating system is used while the operating system is executing. Typically, the program counter 107 is incremented by an amount equal to the number of bytes of the current instruction. The program counter 107 is modified by, for example, a context switch operation or a branch taken operation of a branch instruction. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 107.

Typically, an instruction fetch unit 109 is employed to fetch instructions on behalf of the processor 101. For example, the instruction fetch unit 109 either fetches next sequential instructions, target instructions of branch taken instructions, or first instructions of a program following a context switch. Instruction fetch unit 109 can employ prefetch techniques to speculatively prefetch instructions based on the likelihood that the prefetched instructions might be used. For example, instruction fetch unit 109 can fetch 16 bytes of instruction that includes the next sequential instruction and additional bytes of further sequential instructions.

The fetched instructions can be executed by the processor 101. For example, the fetched instruction(s) can be passed to a decode and dispatch unit 111. In one example, the decode and dispatch unit 111 can belong to the instruction fetch unit 109. The decode and dispatch unit 111 decodes the instruction(s) and forwards information about the decoded instruction(s) to execution unit 113, branch unit 115, and/or load and store unit 117, as appropriate. In some embodiments, the decode and dispatch unit 111 and the load and store unit 117 belong to a processor unit 120. Execution unit 113 can receive information about decoded arithmetic instructions from the instruction fetch unit 109 and can perform arithmetic operations on operands according to the opcode of the instruction. Operands are provided to the execution unit 113 preferably either from memory 105, registers 119 or from an immediate field of the instruction being executed. Results of the execution, when stored, are stored either in memory 105, registers 119 or in other machine hardware (such as control registers, PSW registers and the like).

In some embodiments, fixed-sized chunks of bytes known as words can be transferred from the memory 105 to the register 119. In some embodiments, load/store instructions of the load and store unit 117 provide the ability to take the words stored in memory 105 and pack them into sequential streams to be placed in registers 119. In some embodiments, the memory 105 can be configured to comprise 256-bit memory blocks. A 256-bit memory block can be partitioned into chunks of n bits. During processing, each n-bit chunk is loaded into a register 119.

Figure 2A:
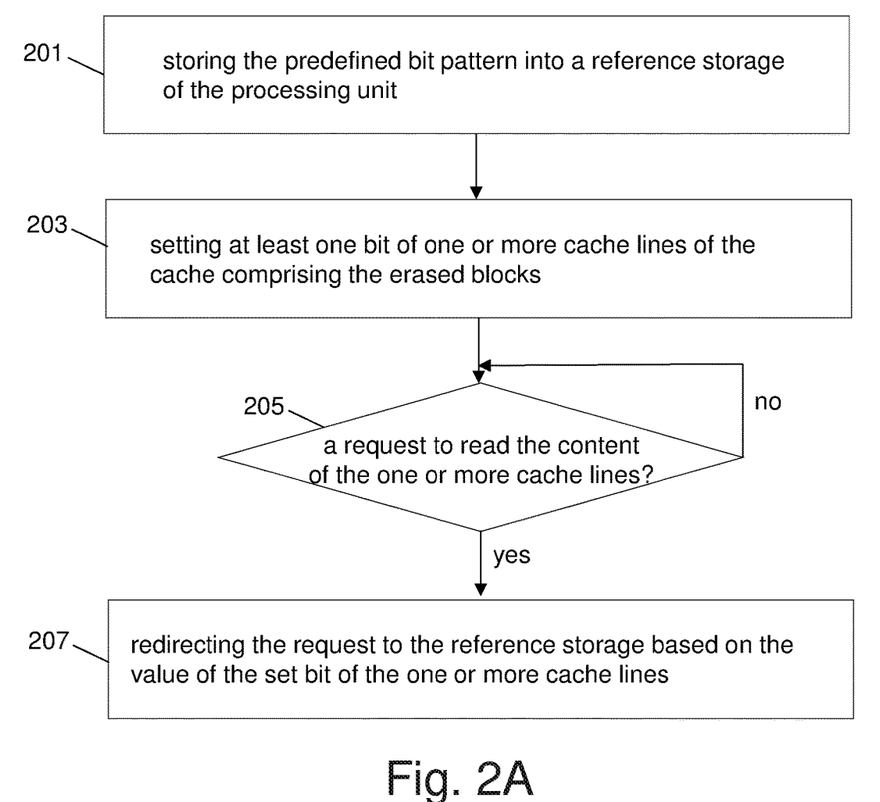
FIG. 2A is a flowchart of a method to erase contiguous blocks in a main memory, in accordance with embodiments of the present disclosure.

FIG. 2A is a flowchart of a method to replace data in a main memory (e.g. memory 105 of processing unit 101). Replacing data can be referred to as overwriting that data. In one example, the replacement of data can be performed in order to erase that data. The replaced data can comprise contiguous blocks of the main memory 105. For example, the erasing can be triggered by an instruction that clears the memory 105 from addresses addr1 to addr2. For simplicity of the description, the contiguous blocks occupy a memory section M that has the same length as a cache line and is aligned to the same boundary (e.g., fits exactly into a cache line). By contrast to conventional techniques, the present disclosure may not need to clear each cache line that contains replaced data. For example, for clearing a 4k page, a Linux kernel will execute a sequence of XC instructions each clearing 256 byte which is the cache line size. The present disclosure can avoid the execution of such instructions that actually store 0 s or other bit patterns in each cache line to be deleted.

In operation 201, the predefined bit pattern can be stored into a reference storage of the processing unit 101. The reference storage can, for example, comprise one or more cache lines. The reference storage can be part of one or more cache levels of the cache 103. For example, the reference storage can comprise the CCL. The CCL can contain the desired bit pattern (e.g. just 0 s, just 1s, a combination of 0 s and 1 s, or any bit pattern up to the length of a cache line). The content of the CCL can be hard-wired, or there can be an instruction to load the CCL with any bit pattern. The instruction can be advantageous as it can enable a flexible choice of the bit pattern to be used. In some embodiments, the CCL may not be overwritten after the initial setup of the computer system 100. In another example, the reference storage can comprise multiple CCLs to support fast loading of several bit patterns.

Figure 2B:
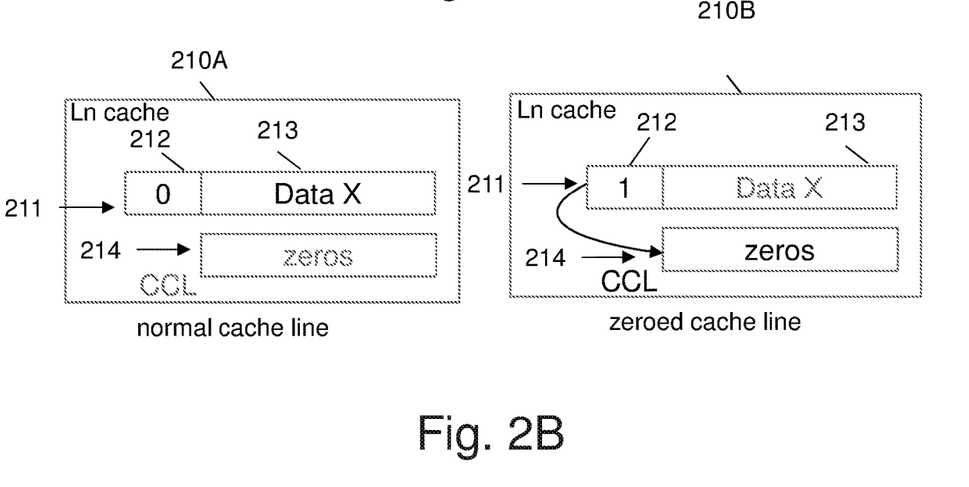
FIG. 2B is a block diagram of an example cache hierarchy illustrating aspects of the flowchart of FIG. 2A, in accordance with embodiments of the present disclosure.

The example of FIG. 2B shows a cache level 210A of the cache 103 as comprising a cache line 211 and the reference storage 214. In this example, the bit pattern is a set of zeros. The reference storage 214 can, for example, be an additional storage. The storage of the bit pattern is performed at the initialization stage of the computer system 100 and a write access to the reference storage 214 is prevented after the initialization stage. Providing the reference storage can enable an alternative to storing the bit pattern into each of the cache lines to be deleted as follows.

In operation 203, at least one bit in the cache directory entry of one or more cache lines of the cache 103 comprising the data (e.g. the erased data blocks) can be set. For example, the cache lines of the cache 103 that comprise the erased data blocks can be identified. These cache lines can be identified in a predefined cache level of the cache 103 or in all cache levels of the cache 103.

The at least one bit can be a new cache state tag in the cache directory entry of every cache line. A new instruction modifying this cache state tag can be introduced. When a program is issuing a write to an exclusive cache line setting it to a defined bit pattern, the cache data itself is not modified and no store is issued through the store hierarchy into memory, but only the cache state tag can be updated indicating the new value of the bit.

Following the example of FIG. 2B, the one or more cache lines can comprise cache line 211 of the cache level 210A. The cache line 211 can be identified as having data 213 to be written back to the main memory 105. The data 213 stored in the cache line 211 is at least part of the data to be written back to main memory 105. In this example, the at least one bit can be a single bit 212. The single bit 212 can be part of the cache directory entry of the cache line 211. The single bit 212 is shown together with the cache line 211 for clarification purpose only. Setting the bit 212 can change the value from zero to one as shown in cache level 210B of FIG. 2B. The cache level 210B indicates the status of the cache level 210A after setting the bit 212.

In case (inquiry operation 205) a request to read the content 213 of the cache line 211 is received, the request can be redirected in operation 207 to the reference storage 214 based on the value of the set bit 212 in the directory entry of the cache line 211. For example, as illustrated in FIG. 2B, once the bit 212 is set to 1, the data request accesses are redirected to read data of the CCL 214. In this way, the data content 213 of the cache line 211 is still present in the cache line 211 and may not need to be deleted. If no request is received, operation 205 can repeatedly check for, or wait for, a request to be received.

When a regular cache line is to be filled with the bit pattern of a CCL, the cache directory redirects any read access from that cache line to the CCL instead. Note that any number of cache lines can share one CCL as CCLs may not be overwritten, except at initialization. In any case, the cache line holding content of section M remains used and is marked as modified as part of the operation that assigns the new content to it. Its content is ignored while the cache line is mapped to a CCL.

Figure 3:
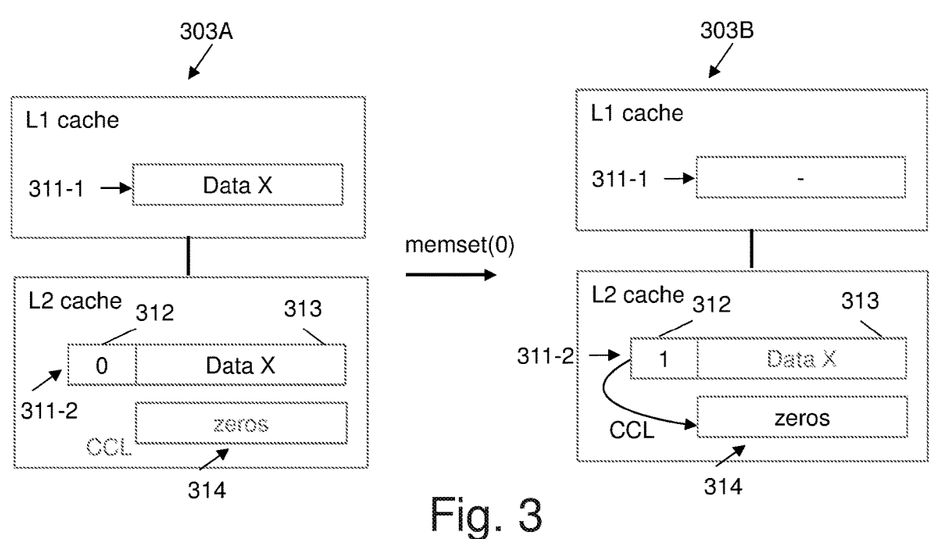
FIG. 3 is a block diagram of an example cache hierarchy having two cache levels, in accordance with embodiments of the present disclosure.

FIG. 3 is a block diagram of a cache hierarchy 303A and 303B. The cache hierarchy 303A comprises a two-level cache having L1 and L2 caches. As indicated in FIG. 3, the L1 and L2 caches each comprises a cache line 311-1 and 311-2 that stores a same content or data 313 (data X) that is, for example, cached from the memory 105. In some embodiments, the content 313 of the cache line 311-2 is referred to as being allocated (e.g. because an entry of the L2 directory is associated with the cache line 311-2).

The L2 cache comprises a CCL 314 that can be used in accordance with the present disclosure. In addition, the cache line 311-2 of the L2 cache includes a bit 312 that can be set to zero or one. The value of the bit 312 can be set in accordance with the present disclosure for redirecting read access to the content 313 to reading the content of the CCL 314.

FIG. 3 illustrates a technique for setting of the cache line 311-2 to a constant bit pattern (e.g. zeros). This can, for example, be performed by executing a predefined instruction. For example, the execution of instruction memset(0) (or "XC D(256,Rx),D(Rx)") on the cache lines 311-1 and/or 311-2 can be performed. The execution of the instruction can result in the cache line 311-1 being removed from L1 cache by marking it as invalid and the bit 312 is set to one. Setting the bit 312 to 1 can further comprise or trigger the L2 cache entry that corresponds to the cache line 311-2 being redirected to the CCL 314 in the cache directory as shown in cache hierarchy 303B.

The techniques of FIG. 3 can, for example, be performed in response to a deletion or overwriting of the data X from the memory 105 by zeros. The method of FIG. 3 can be advantageous when the reference storage is present in L2 cache only and thus only cache lines of L2 cache are redirected.

Figure 4A:
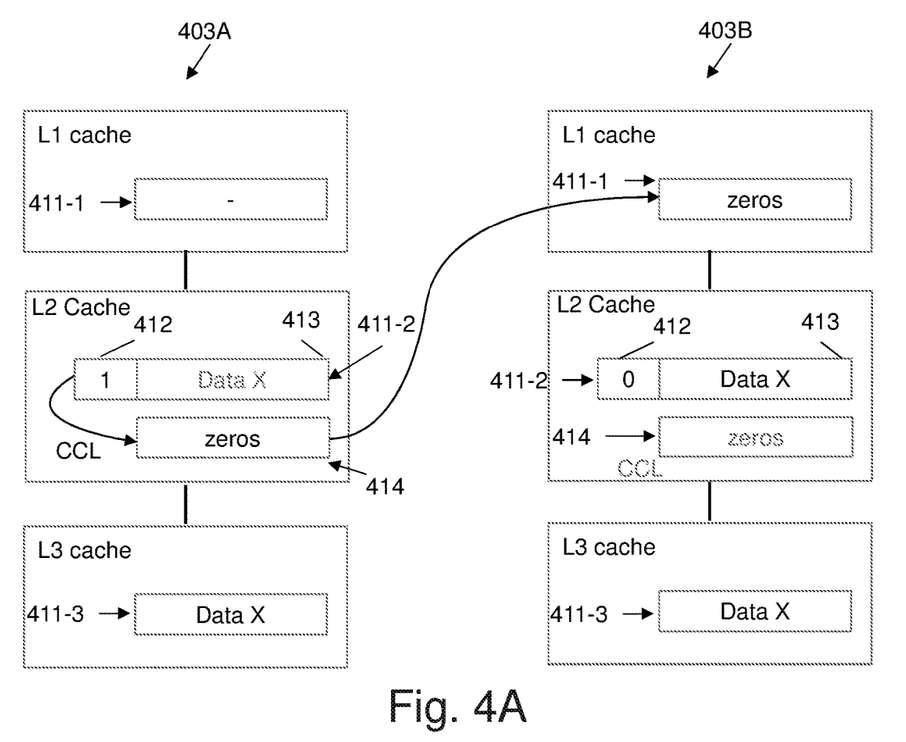
FIG. 4A is a block diagram of an example cache hierarchy with three cache levels and performing a copy-up operation, in accordance with embodiments of the present disclosure.

FIG. 4A illustrates a method for a copy-up of the redirected cache line 411-2 of a cache hierarchy 403A. The cache hierarchy 403A comprises a three-level cache having a L1, L2 and L3 caches. As indicated in FIG. 4A, the L2 and L3 caches each comprises a cache line 411-2 and 411-3 that stores a same content or data 413 that is, for example, cached from the memory 105. The L1 cache comprises an invalid cache line 411-1 in cache hierarchy 403A. For example, the content of L1 and L2 caches of cache hierarchy 403A can be the result of the setting process of FIG. 3 (e.g. the cache hierarchy 403A comprises the cache hierarchy 303B).

As with FIG. 3, the L2 cache comprises a CCL 414 that can be used in accordance with the present disclosure. In addition, the directory entry of the cache line 411-2 of the L2 cache is provided with a bit 412 that can be set to zero or one. The value of the bit 412 can be set in accordance with the present disclosure for redirecting read access to the content 413 to reading the content of the CCL 414. The bit 412 is set to one in the cache hierarchy 403A indicating that the read accesses to the content 413 are redirected to the CCL 414.

FIG. 4A thus illustrates a technique for a copy-up of the redirected cache line 411-2. For example, on copy-up of the redirected cache-line 411-2, the CCL 414 content is copied to the L1 cache line 411-1 of cache hierarchy 403B and the redirection of the cache line 411-2 in L2 is reset, where the bit 412 is set to zero in cache hierarchy 403B.

The method of FIG. 4A can, for example, be performed in response to a cache miss of the data X (e.g., content 413) occurs at the L1 cache. The method of FIG. 4A can be advantageous as it can seamlessly integrate the present technique into existing systems.

Figure 4B:
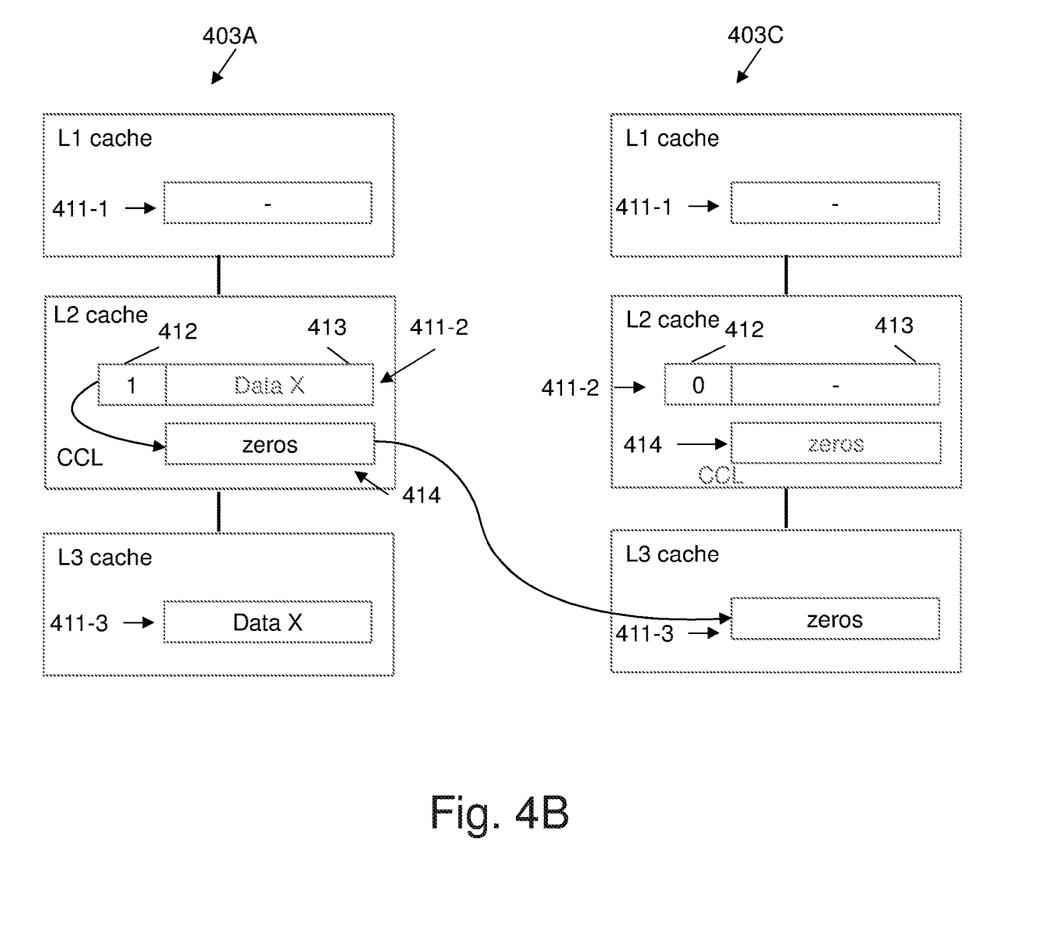
FIG. 4B is a block diagram of an example cache hierarchy with three cache levels and performing a copy-down operation, in accordance with embodiments of the present disclosure.

FIG. 4B illustrates a method for a copy-down of the redirected cache line 411-2. For example, on copy-down of the redirected cache line 411-2 the CCL 414 content is copied to the L3 cache line 411-3 in the cache hierarchy 403C and the redirection of the cache line 411-2 in L2 is reset, where the bit 412 is set to zero in cache hierarchy 403C and the cache entry in L2 is freed in the cache hierarchy 403C.

Figure 5:
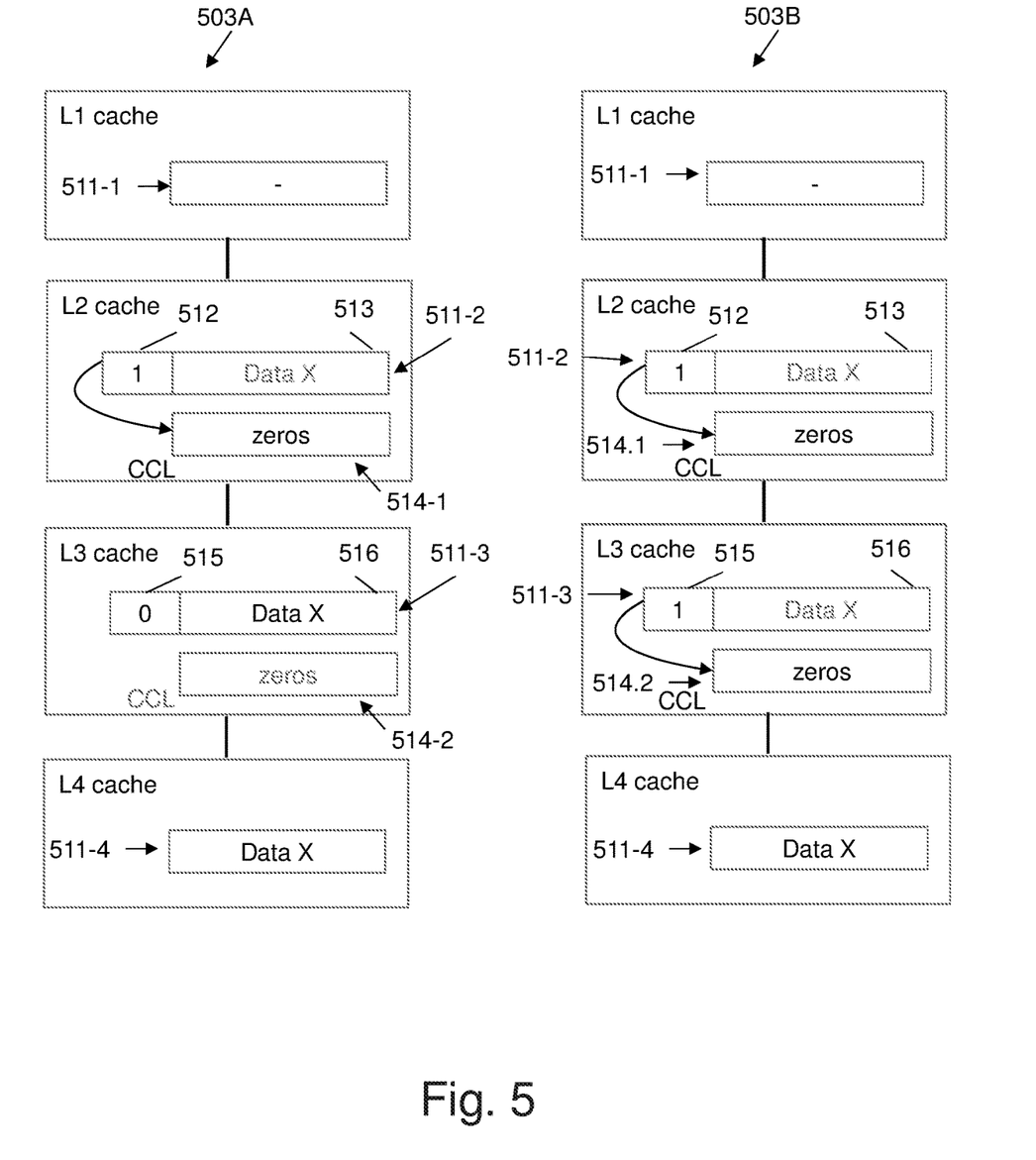
FIG. 5 is a block diagram of an example cache hierarchy with four cache levels, in accordance with embodiments of the present disclosure.

FIG. 5 is a block diagram of a cache hierarchy 503A and 503B. The cache hierarchy 503A comprises a four-level cache having a L1, L2, L3 and L4 caches. As indicated in FIG. 5, the L2, L3 and L4 caches each comprises a cache line 511-2, 511-3 and 511-4 that stores a same content or data 513, 516 that is, for example, cached from the memory 105. The L1 cache comprises an erased cache line 511-1.

In FIG. 5, both the L2 cache and L3 cache comprise a respective CCL 514-1 and 514-2 that can be used in accordance with the present disclosure. In addition, each of the cache lines 511-2 of the L2 cache and 511-3 of the L3 cache is provided with a bit 512 and 515 respectively that can be set to zero or one. The value of the bits 512 and 515 can be set in accordance with the present disclosure for redirecting read access to the content 513 and 516 to reading the content of the CCL 514-1 and 514-2 respectively. The bit 512 is set to one in the cache 503A indicating that the read accesses to the content 513 are redirected to the CCL 514-1. The bit 515 is set to zero in the cache 503A indicating that there is no redirection.

FIG. 5 illustrates a technique for a copy down of the redirected cache line 511-2. For example, on copy-down of the redirected cache-line 511-2, the bit 515 is set to one in the cache hierarchy 503B. This indicates that the read accesses to the content 516 are redirected to the CCL 514-2.

The copying up of the redirected cache line 511-2 of the cache hierarchy 503A can, for example, result in copying the CCL 514-1 into the L1 cache line 511-1 and the setting of the bit 512 to 0 and the bit 515 to one.

In the following, an example for clearing data from memory 105 is described. In this example, the cache 103 comprises two cache levels, L1 and L2. The content of a main memory section M can be stored in the corresponding cache lines of L1 and L2 caches. The access to the memory section M causes the cache management logic to behave as if content of M were loaded into a cache line of L2 in the usual way, but without transferring data to that cache line of L2. This can be done by marking the cache line as being loaded exclusively for write access and all usual invalidation actions due to the cache coherency protocol are performed. L2 is provided with a CCL. Clearing the memory section M can be performed as follows.

1. Section M from the memory 105 can first be loaded into the cache. The L2 directory is modified so that the entry for the cache line of L2 holding M is redirected to the CCL of L2.

2. The cache line gets marked as "modified" in L2. This means that the cache line needs to get written, as if it had been written into the usual way.

3. For the L1 cache, the cache line holding M is marked as invalid.

4. If section M is stored into while it is still in the cache, the line holding M then gets loaded from L2 to L1 (e.g., after the L1 cache performs a miss because it does not have the latest content). This action causes the CCL's content to be copied into a regular cache line. The action to mark the L2 line as cleared gets undone by resetting the redirection to the CCL.

If there are no further stores into or reads from section M for a while, the modified line in the L2 cache can be written back to memory 105 as part of the normal cache activities.

In another example, a method to erase contiguous blocks in a main memory coupled to a processor with a processor cache hierarchy for accessing the main memory is provided. The method comprises: the processor maintaining a state tag for every cache line in a first level of the cache hierarchy; in response to the processor receiving an instruction to write to an exclusive cache line in the first level in order to set it to a specific bit pattern, setting the state tag of the cache line to refer to the CCL; in response to a store to main memory operation for the content of a cache line in the first level, determining if the state tag of the cache line is set, and in that case writing the bit pattern to the cache line before storing the cache line; in response to an evict to a second level of the cache hierarchy operation for a cache line in the first level, determining if the state tag of the cache line is set, and in that case writing the bit pattern to the cache line before evicting the cache line.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer system comprising:
 a main memory coupled to a processor, a control unit, and
  a cache hierarchy, the cache hierarchy comprising a
  plurality of cache levels ordered in accordance with a
  speed of access by the processor to respective cache levels of the plurality of cache levels, a highest cache level is closest to the processor, a lowest cache level is closest to the main memory, the main memory comprising a predefined bit pattern replacing existing data of the main memory, the control unit storing program instructions executable by the processor to cause the processor to perform a method comprising:

storing the predefined bit pattern into a reference storage of the computer system;

setting a value of a first bit in a cache directory entry of a first cache line of the cache hierarchy, the first cache line comprising the existing data;

determining that the first cache line is part of a predefined cache level of the cache hierarchy;

marking content of the cache line corresponding to the first cache line in each cache level higher than the predefined cache level as invalid;

receiving a request to read the existing data of the first cache line; and in response to receiving the request to read the existing data of the first cache line, redirecting the request to the predefined bit pattern in the reference storage based on the value of the first bit in the cache directory entry of the first cache line.

2. A method for storing data in a computer system, the method comprising:

storing a predefined bit pattern into a reference storage of the computer system, wherein the computer system comprises a main memory coupled to a processor and a cache hierarchy, the cache hierarchy comprising a plurality of cache levels ordered in accordance with a speed of access by the processor to respective cache levels of the plurality of cache levels, wherein a highest cache level is closest to the processor, wherein a lowest cache level is closest to the main memory, the main memory comprising existing data;

setting a value of a first bit in a cache directory entry of a first cache line of the cache hierarchy, the first cache line comprising the existing data;

receiving a request to read the existing data of the first cache line; and in response to receiving the request to read the existing data of the first cache line, redirecting the request to the predefined bit pattern in the reference storage based on the value of the first bit in the cache directory entry of the first cache line, whereby the predefined bit pattern replaces the existing data of the main memory.

3. The method of claim 2, wherein storing the predefined bit pattern is performed at an initialization stage of the computer system and prior to receiving the request, wherein the method further comprises:

preventing write accesses to the reference storage after the initialization stage of the computer system.

4. The method of claim 2, further comprising:

in response to receiving a store instruction to store data in the first cache line, performing a copy-on-write operation of the predefined bit pattern of the reference storage based on the value of the first bit of the first cache line.

5. The method of claim 4, wherein the store instruction is received within a predefined time period.

6. The method of claim 4, wherein the first cache line is part of a given cache level of the cache hierarchy, and wherein performing the copy-on-write operation further comprises:

copying content of the reference storage to a higher cache level than the given cache level prior to storing the data in the first cache line.

7. The method of claim 2, further comprising:

determining that a given cache line of the cache hierarchy is not used for a predefined time period; and in response to determining that the given cache line is not used for a predefined time period, moving content of the given cache line to the main memory.

8. The method of claim 2, the cache hierarchy comprising multiple cache levels, the method further comprising:

determining that the first cache line is part of a predefined cache level of the cache hierarchy; and wherein the setting the value of the first bit further comprises:

marking content of the cache line corresponding to the first cache line in each cache level higher than the predefined cache level as invalid.

9. The method of claim 8, further comprising:

consecutively copying from each cache level of the cache hierarchy starting from the predefined cache level to a corresponding cache line of a following higher cache level, the predefined bit pattern; and resetting the value of the first bit of the first cache line to disable redirection of future requests.

10. The method of claim 8, further comprising:

copying the predefined bit pattern to a cache line of a cache level higher than the predefined cache level;

resetting the value of the first bit of the first cache line to disable redirection of future requests; and marking content of the first cache line as invalid.

11. The method of claim 8, wherein the cache hierarchy comprises three cache levels, and wherein the predefined cache level is a second cache level of the three cache levels.

12. The method of claim 8, wherein the predefined cache level comprises a cache directory comprising, for each cache line in the predefined cache level, a corresponding entry, and wherein the method further comprises:

indicating that the first cache line is a modified cache line using the corresponding entry in the cache directory.

13. The method of claim 2, wherein the reference storage comprises a plurality of cache lines.

14. The method of claim 2, wherein the existing data is replaced in response to receiving a request to clear the data, and wherein the predefined bit pattern comprises zeros.

15. The method of claim 2, wherein the existing data is replaced in response to receiving a request to clear the data, and wherein the predefined bit pattern comprises ones.

16. The method of claim 2, wherein the predefined bit pattern consists of zero values, and wherein the method further comprises:

in response to receiving a second request to read the existing data of the first cache line, returning zero to the first cache line.

17. The method of claim 2, wherein the predefined bit pattern consists of one values, and wherein the method further comprises:

in response to receiving a second request to read the existing data of the first cache line, returning zero to the first cache line.

18. The method of claim 2, further comprising:

providing a machine instruction configured to store the predefined bit pattern into the reference storage.

19. The method of claim 2, wherein the storing of the predefined bit pattern comprises hard-wiring the predefined bit pattern.

20. A computer program product for storing data in a computer system, the computer program product comprising a computer readable storage medium having program instructions embodied therewith, wherein the computer readable storage medium is not a transitory signal per se, the program instructions executable by a processor to cause the processor to perform a method comprising:

storing a predefined bit pattern into a reference storage of the computer system, wherein the computer system comprises a main memory coupled to a processor and a cache hierarchy, the cache hierarchy comprising a plurality of cache levels ordered in accordance with a speed of access by the processor to respective cache levels of the plurality of cache levels, wherein a highest cache level is closest to the processor, wherein a lowest cache level is closest to the main memory, and wherein the main memory comprises the predefined bit pattern replacing existing data of the main memory;

setting a value of a first bit in a cache directory entry of a first cache line of the cache hierarchy, the first cache line comprising the existing data;

determining that the first cache line is part of a predefined cache level of the cache hierarchy;

marking content of the cache line corresponding to the first cache line in each cache level higher than the predefined cache level as invalid;

receiving a request to read the existing data of the first cache line; and     in response to receiving the request to read the existing data of the first cache line, redirecting the request to the predefined bit pattern in the reference storage based on the value of the first bit in the cache directory entry of the first cache line.

\* \* \* \* \*